UNITED STATES PATENT OFFICE.

WILLIAM B. GERE, OF SYRACUSE, NEW YORK, ASSIGNOR TO MERRELL-SOULE COMPANY, OF SYRACUSE, NEW YORK, A CORPORATION OF NEW YORK.

FOOD PRODUCT.

1,236,700.      Specification of Letters Patent.      Patented Aug. 14, 1917.

No Drawing.      Application filed February 1, 1915. Serial No. 5,499.

*To all whom it may concern:*

Be it known that I, WILLIAM B. GERE, a citizen of the United States, and resident of Syracuse, in the county of Onondaga, in the State of New York, have invented new and useful Improvements in Food Products, of which the following is a full, clear, and exact description.

This invention relates to certain new and useful improvements in food products and method of manufacturing and preparing the same, and more particularly to a compound food product in powdered form, readily soluble, susceptible of being kept for long periods of time, and in which the particles of the separate substances are uniformly distributed throughout the mass and preferably this is accomplished by homogeneously incorporating one substance in the particles of another substance; or, in other words, in which the particles constituting the compound food product are a homogeneous mass of the two substances in proper distribution.

The basic idea of the invention centers around the compounding of milk for food products with various other substances, particularly sugar, in such a manner that the resultant product in powdered form, preferably containing less than three per cent. of moisture, presents the component substances in uniform distribution adapted for long preservation in any climate and readily soluble in liquids.

Milk powder produced by the process set forth in Letters Patent granted to Robert Stauf, No. 666,711, and which may be called the "spraying process" is termed soluble, and when properly mixed with water or other suitable liquid and thoroughly beaten in by means of suitable beaters or other devices will enter into complete solution, forming a reconstituted milk, and in the sense that the powder is susceptible of such complete solution the term "soluble" is properly applied, but it is obvious that the term "soluble" so far as it relates to the rapidity or ease with which the substance enters into complete solution, is a relative one and that the term is applied to milk powder produced by the "spraying process" to distinguish it from milk powder produced by contact with heated surfaces or rollers, which powder is not soluble in or capable of entering into complete solution with cold water, but when mixed with hot water and thoroughly stirred or beaten in will for a short time retain an apparent solubility, but if allowed to stand unagitated for any considerable amount of time, there will be a heavy precipitation showing that the solution is not complete, and one of the objects of this invention is to cause the soluble milk powder produced by the "spraying process" to more readily and easily enter into the state of complete solution of which it is capable.

For example, when a spoonful of powdered milk produced by the "spraying process" is placed in a receptacle containing hot liquid, such as coffee or the like, the light particles tend to float upon the surface of the liquid, and when agitated or stirred, as with a spoon, collect in balls or masses of various sizes and only partially enter into solution. Upon breaking up these balls or masses, the interior portions are found practically perfectly dry, the particles of milk massing together in such a manner as to prevent penetration of the fluid.

Complete solution of which the powder is susceptible is dependent upon contact of the fluid with the separate particles of the milk, and necessitates a particular and careful treatment.

I have discovered that by combining with this milk powder a substance readily soluble in water and which enters into solution practically automatically upon contact with the fluid or with a relatively small degree of agitation, the dissolution of this substance tends to prevent the massing of the particles and causes the dissolution of the less readily soluble milk powder, the extent to which this is accomplished depending largely upon the uniformity of distribution of the two substances.

By this process, not only is the milk rendered readily soluble in fluid, in itself an advantage not heretofore attained, but a new product as a homogeneous compound of two or more separate substances is obtained.

The process consists essentially in compounding the separate substances in desired proportions in a solution so that the relative distribution is uniform, and in reducing the liquid compound to powdered form by the process set forth in said Stauf patent—that is, by bringing the liquid in finely divided condition into moisture-absorbing air so that the liquid constituents are substantially completely vaporized, the resultant powder containing less than three per cent. of moisture and being a homogeneous mass of the substances comprising the product.

I may take a quantity of liquid milk and dissolve therein a quantity of sugar, (either cane, beet or malt sugar in accordance with the product desired), equal in weight to the solids of the milk or any other desired proportions of the substances and reduce the compound to powdered form in the manner above described, by vaporizing substantially all of the liquid constituents, so that the product combining the separate substances in uniform distribution contains a very slight amount of moisture, such amount, in case skim milk is used, preferably not exceeding three per cent., and in case cream is used, not more than one and one-half per cent. and in case whole milk or partially skimmed milk are used, the moisture content should preferably be reduced as low as two and one-half per cent., and in using cream the moisture content may advantageously be reduced as low as one half of one per cent., the preferable amount varying with the percentage of butter fats contained in the milk, for I have discovered that although the keeping quality of the product depends upon various correlated conditions, yet one of the most important of these is the moisture content.

When this product is placed in hot water, coffee, tea, etc., the sugar prevents massing of the particles and the rapid dissolution of the sugar upon contact with the liquid breaks up the particles of the product, and the specific gravity of the sugar causes the immersion of the particles which are rapidly and minutely subdivided by the dissolution of the sugar, so that the milk in very minute quantities is subjected to the action of the liquid and rapidly (particularly if slightly agitated) enters into complete solution.

The substances may be combined in various proportions and the milk, as above indicated, may be either skim milk, whole milk or cream, or any other desired proportion of the butter fats or other constituents of the milk. I may pasteurize and I may condense the milk in any suitable or well known manner before dissolving the sugar therein or mixing the sugar therewith, and I may heat the liquid mixture before spraying to facilitate the vaporization of the moisture constituents.

The process is applicable to various combinations of substances, such as milk, sugar and cocoa or chocolate, or milk, sugar and coffee, or milk, sugar and egg, or milk and any soluble solid or solids, preferably including a solid more readily soluble than the milk powder, and I am enabled to produce a number of readily soluble new, useful and commercial products by reason of my discovery and the process herein described of which the above combinations are important instances. As an example, I find that by forming a liquid mixture consisting of substantially 15% cocoa, 45% sugar, and 40% milk solids, and reducing the same to powder as hereinbefore described, a product is produced which combines the milk, sugar and cocoa in uniform and homogeneous distribution and which is readily soluble in water, and when dissolved produces an excellent beverage without the addition of any substance except water.

Various soluble substances which enter into solution with some difficulty may be rendered more readily soluble by the homogeneous incorporation of a readily soluble substance, and particularly by the homogeneous incorporation of a readily soluble crystalline substance, such as sugar, salt, or the like, having a higher specific gravity than that of the milk powder or the liquid with which it is to enter into solution.

The homogeneous, soluble, practically permanent compound of milk and sugar prepared as herein described may be considered as a base, and various substances in powdered form, such as cocoa, chocolate, coffee, egg, etc., may be mechanically mixed therewith in desired proportion to produce a new, useful and readily soluble product, and I desire to claim herein the base with which many and various substances may be mixed in many and various ways, as mechanically with the base product, or homogeneously with the solution in the process of preparing the base, and although I have described particular combinations of substances to which the process is applicable, and particular products resultant from such combinations, I do not desire to limit myself to any particular combination of substances or any particular proportions of substances in the combination, as it is obvious that the process is applicable to many and various substances and combinations of the same and many and various proportions of such substances, and that many changes may be made in substances and proportions of substances without departing from the spirit of this invention as set forth in the appended claims.

What I claim is:—

1. A soluble food product in powdered form, consisting of substantially dry spherical particles, comprising homogeneously distributed milk and sugar.

2. A readily soluble food product in powdered form, consisting of substantially dry spherical particles comprising homogeneously distributed milk and sugar and in which the natural properties of the solids have not been altered.

In witness whereof I have hereunto set my hand this 30th day of January 1915.

WILLIAM B. GERE.

Witnesses:
  E. A. THOMPSON,
  VIOLA HOWLAND.